United States Patent [19]

Tsou et al.

[11] Patent Number: 5,070,723
[45] Date of Patent: Dec. 10, 1991

[54] CONDENSER ON-LINE LEAK DETECTOR AND METHOD

[75] Inventors: John L. Tsou, Foster City, Calif.; Yusuf Mussalli, Pawtucket, R.I.

[73] Assignee: Electric Power Research Institute, Inc., Palo Alto, Calif.

[21] Appl. No.: 409,709

[22] Filed: Sep. 20, 1989

[51] Int. Cl.$^5$ .............................. G01M 3/22
[52] U.S. Cl. ...................... 73/40.7; 73/40.5 R; 165/11.1; 165/11.2
[58] Field of Search .............. 73/40.5 R, 40.7; 165/11.1, 11.2

[56] References Cited

U.S. PATENT DOCUMENTS

| | | | |
|---|---|---|---|
| 3,975,943 | 8/1976 | Brachet | 73/40.7 |
| 4,226,113 | 10/1980 | Pelletier et al. | 73/40.7 |
| 4,232,546 | 11/1980 | Dumont | 165/11.1 |
| 4,585,203 | 4/1986 | Monne et al. | 165/11.2 |
| 4,638,667 | 1/1987 | Zimmer et al. | 165/11.1 |
| 4,688,627 | 8/1987 | Jean-Luc et al. | 165/11.1 |

FOREIGN PATENT DOCUMENTS 2552341 6/1976 Fed. Rep. of Germany ..... 165/11.2

Primary Examiner—Michael J. Tokar
Assistant Examiner—Craig Miller
Attorney, Agent, or Firm—Flehr, Hohbach, Test, Albritton & Herbert

[57] ABSTRACT

System and method for detecting and locating leaks in a steam condenser while the condenser is on-line and operating in its normal capacity. A tracer gas is mixed with water and introduced into the tubes of the condenser through an injector which can be positioned selectively to direct the gas toward different ones of the tubes. The occurrence of a leak is detected by monitoring for the presence of the tracer gas in the condensation chamber, and the location of the leak is determined from the position of the injector when the leak occurs.

16 Claims, 1 Drawing Sheet

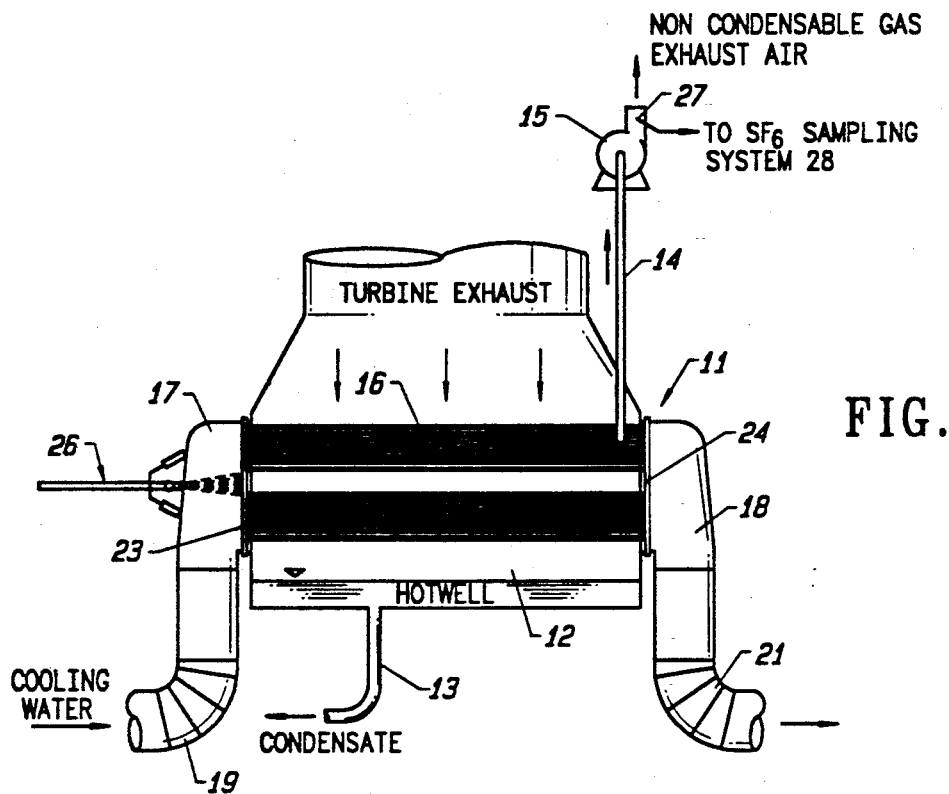
FIG. 1
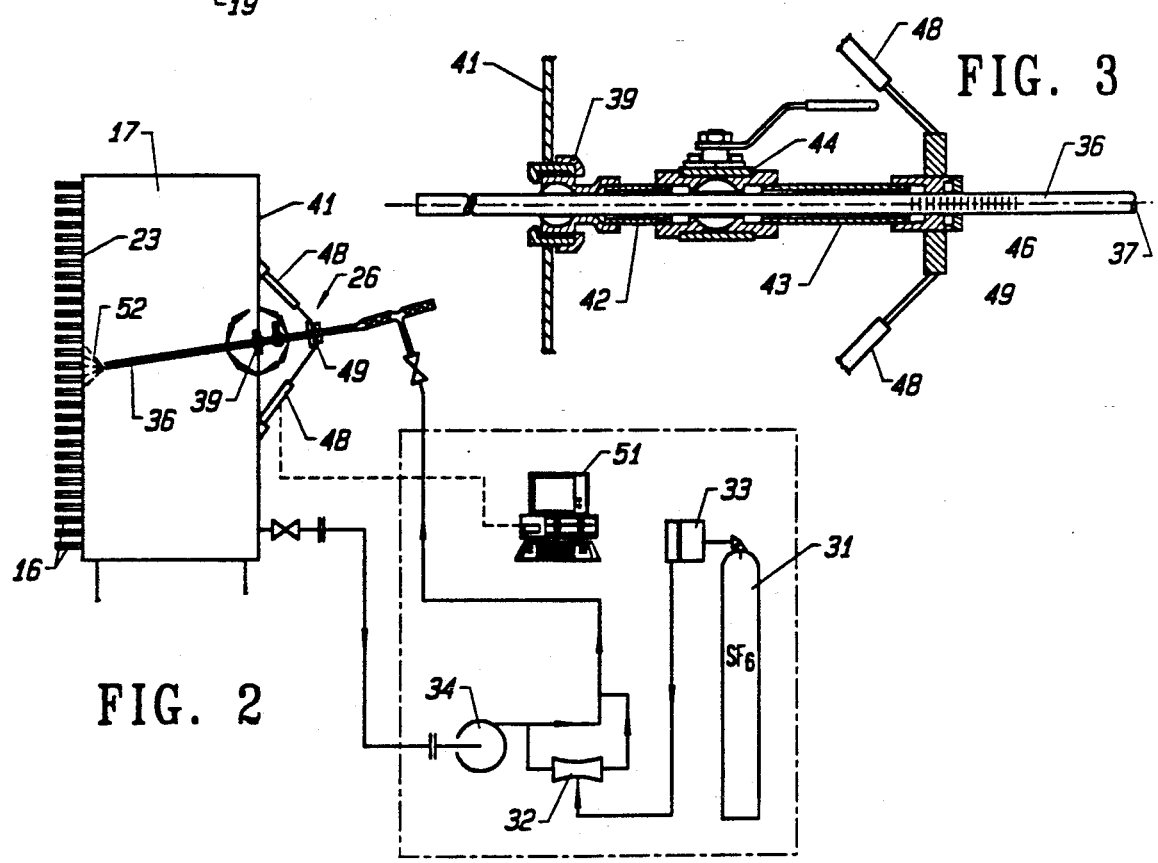
FIG. 2
FIG. 3

CONDENSER ON-LINE LEAK DETECTOR AND METHOD

This invention pertains generally to power plants and, more particularly, to a system and method for detecting and locating leaks in a steam condenser.

Steam is utilized to drive turbines in a number of power plants. Systems of this type generally include a steam generator, a turbine, and a condenser connected together in a closed loop system. The generator produces steam which drives the turbine and is then converted to water by the condenser. Water from the condenser is returned to the generator where it is once again converted to steam. The system can be nuclear powered or powered by fossil fuel, and the term "steam generator" is used herein to include fossil plant boilers as well as nuclear plant steam generators.

A condenser of the type commonly used in such systems generally has condensation chamber to which the steam from the turbine is applied and a plurality of tubes through which a coolant such as water is circulated. The tubes extend through the chamber and are generally supported by a pair of support plates or "tube sheets" on opposite sides of the chamber. The tubes communicate with inlet and outlet water boxes on respective sides of the chamber, and the tube sheets usually form the walls which separate the water boxes from the chamber.

One of the major problems with such systems is contamination of the condensate by impurities such as sodium, chloride, silica, etc. contained in the cooling water leaking through the condenser. In the past several years, it has been found that even minor condenser leaks can lead to major failures of system equipment such as steam generators, turbines and heaters.

The occurrence of a leak requires immediate action on the part of the owner or operator of the equipment to find the leak and plug it. This task typically takes several hours, and it usually requires that at least a portion of the system be shut down during the process. With modern condensers having as many as 30,000 tubes, or more, and it can take a significantly longer time to isolate a leaking tube using traditional methods. It has been estimated that plugging a single tube leak can cost as much as $50,000 to $100,000, depending on the equipment involved and the nature of the leak. The cost of tube leaks is so high that many utility companies have made expensive upgrades to their condensers to minimize the possibility of leaks.

Because of the high costs of locating leaks by the more traditional techniques which require at least a partial system shut down, techniques have heretofore been developed for locating leaks through the use of tracer gases while the system remains on-line and fully operational. Tracer gases such as helium were introduced for use in power plants about 10 years ago, and since that time more sensitive gases such as sulfur hexafluoride ($SF_6$) have been found to be even more effective. In one such technique, the tracer gas is injected into the bulk water flow to determine if there are any leaks in the tubes or in the joints between the tubes and tubesheets of the condenser. While this technique can be employed while the system is in full operation, it cannot pinpoint the location of a leak to a particular tube or section of a tubesheet.

U.S. Pat. No. 4,524,607 describes a technique in which a tracer fluid is released in a controlled manner through a matrix of conduits to predetermined groups of tubes in a condenser. When the tracer fluid is detected in the condensing chamber, the location of the leak is known to be within the group of tubes which are receiving the fluid at the time.

U.S. Pat. No. 4,226,113 describes a technique in which a tracer gas is applied to a successively smaller group of tubes until the particular tube or tubes having leaks are isolated. While this technique may be effective in isolating the location of a leak, it requires that the condenser be shut down to provide access to the tube sheet to apply the gas to the particular tubes.

It is in general an object of the invention to provide a new and improved system and method for detecting and locating leaks in a condenser without interrupting the normal operation of the condenser.

Another object of the invention is to provide a system and method of the above character which overcome the limitations and disadvantages of the techniques heretofore employed for leak detection.

These and other objects are achieved in accordance with the invention by mixing a tracer gas with water and introducing the water with the tracer gas into the tubes of an on-line condenser through an injector which can be positioned selectively to direct the gas toward different ones of the tubes. The occurrence of a leak is detected by monitoring for the presence of the tracer gas in the condensation chamber, and the location of the leak is determined from the position of the injector when the leak occurs.

FIG. 1 is a fragmentary front elevational view, partly broken away, of one embodiment of a condenser with a leak detector system according to the invention.

FIG. 2 is a schematic diagram of a portion of the leak detector system in the embodiment of FIG. 1.

FIG. 3 is a detailed view of a portion of the leak detector system in the embodiment of FIG. 1.

In the drawings, the invention is illustrated in connection with a steam surface condenser 11 of conventional design. This condenser has a condensation chamber 12 in which exhaust steam from a turbine (not shown) is condensed. The condensed steam collects in the lower portion of the chamber, and the condensate is removed from the chamber through an outlet line 13. Non-condensable exhaust gases are removed from the chamber through an exhaust line 14 by a vacuum pump 15.

The condenser also has a plurality of coolant tubes 16 which extend through the condensation chamber between an inlet water box 17 and an outlet water box 18. Cooling water is circulated through the tubes from an inlet line 19 connected to inlet water box 17 and discharged through an outlet line 21 connected to outlet water box 18. The number of tubes and the size of the condensation chamber are dependent upon the size of the condenser, and a large condenser may have as many as 30,000 tubes, or more. The end portions of the tubes are attached to tubesheets 23, 24 which separate the water boxes from the condensation chamber. Leaks can occur either in the tubes themselves or in the joints between the tubes and the tubesheet.

The leak detection system includes an injector 26 through which a jet of water containing a tracer gas is directed toward the inlet ends of the coolant tubes while the condenser is in operation. In the event of a leak in one of the tubes or in a joint between the tubes and the tubesheets, the tracer gas will pass through the leak into the condensation chamber, and its presence is detected at a sampling point 27 in the exhaust system by a sampling system 28 which monitors the exhaust gas continuously for the tracer gas. The injector can direct the tracer gas toward specific sections of the tubesheet, and the location of a leaking tube is determined by monitoring the position of the injector.

The sampling point is preferably located downstream of the exhaust pump to avoid high vacuum levels, but as close to the pump as possible to keep response time as low as possible. The sampling device comprises a probe which extracts a sample well within the offgas flue to assure a representative sample. The sampling system preferably includes a gas analyzer which can detect the tracer gas in concentrations as low as 0.2 parts per billion, which has been found to be sufficient for the detection of a tube leak as small as one gallon per day.

The tracer gas is preferably one which will not decompose in the condenser into by-products which are corrosive or otherwise harmful to any significant extent. The tracer gas should also remain in solution in the cooling water side of the condenser and come out of solution once it enters the steam side of the condenser through a leak. In addition, it should not present a health risk to power plant personnel, and it should not have corrosive effects on power plant equipment. Suitable gases include sulfur hexafluoride ($SF_6$) and helium. Of these two gases, $SF_6$ has the advantage of being detected at very low concentrations (e.g., less than 1 part per million by volume in air). This low detection limit is possible in part because $SF_6$ does not normally occur in nature, which means that background concentrations approach zero. The low background concentration results in a detection limit which is 7 to 8 orders of magnitude lower than that of helium which is more commonly found in the atmosphere.

With $SF_6$, a preferred method of detection is electron capture detection utilizing an electron capture cell having two electrodes and a foil of radioactive metal. A voltage difference is maintained across the two electrodes, causing a small electric current to flow across the air gap between the electrodes. The sample gas is pumped into the cell where it passes between the electrodes and is ionized by the radioactive foil. This supports an electric current flow across the gap. Since ionized $SF_6$ is electrophilic (captures electrons), the level of the current flow is reduced in proportion to the amount or concentration of $SF_6$ in the sample. With this technique, levels of $SF_6$ down to 0.1 parts per billion are detectable.

The tracer gas is mixed with water for injection into the condenser tubes. Suitable mixtures include $SF_6$ dissolved in water, $SF_6$ entrained in water, $SF_6$ and air entrained in water, helium dissolved in water, and $SF_6$ dissolved in a tracer fluid which is then mixed in water. Suitable tracer fluids include the family of Fluorinert fluorinated organic compounds such as FC-87 which are available from The 3M Company. Of these mixtures, a mixture of $SF_6$ and water is preferred because of its relatively low cost, less complex synthesis, greater concentration of available $SF_6$ for delivery to condenser leaks, lower detection limit, and ability to detect very small leaks.

As illustrated in FIG. 2, $SF_6$ tracer gas from a source 31 is mixed with water in an ejector venturi 32. The gas is delivered to the venturi through a pressure regulator 33, and water from the lower portion of water box 17 is supplied to the venturi by an injection pump 34. Water passing through the venturi creates a vacuum that causes the tracer gas to flow into the venturi where it mixes with the water. This method of mixing the gas with the water has been found to provide thorough mixing and dispersion of $SF_6$ gas bubbles into the water. The injector pump also provides the pressure necessary to discharge the tracer mixture through the injector 26.

In the embodiment illustrated, injector 26 comprises an axially elongated lance 36 having an axially extending passageway 37 through which the tracer mixture is discharged. This lance is generally similar to a lance which has heretofore been used for injecting chlorine into the tubes of a condenser to control biofouling in the condenser. The chlorination lance and the use of chlorination to control biofouling in fossil fuel power plants are described in an Electric Power Research Institute report entitled "Condenser-targeted Chlorination Design", EPRI CS-4279, dated October 1985.

The lance is mounted on a swivel mount 39 on the outer wall 41 of inlet water box 17, with the inner or distal end portion of the lance inside the water box and the outer or proximal end portion of the lance extending outside the water box. The lance is positioned coaxially within a tubular housing comprising an inner section 42 which is affixed to the swivel mount, an outer section 43, and a central section 44. In the embodiment illustrated, the inner and outer housing sections are pipe nipples, and the central section is a full port ball valve with the lance passing through the port in the ball. The lance can be advanced and retracted axially within the housing, and the ball valve can be rotated to hold the lance in a desired axial position. Scale marks 46 on the lance indicate how far it is inserted into the box.

Means is provided for monitoring the pivotal position of the lance. This means includes a plurality of linear variable differential transformers (LVDTs) 48 which are connected between the outer wall 41 of the water box and a collar 49 mounted on the outer end of housing section 43. In the embodiment illustrated, three LVDTs are employed, and they are spaced equally about the axis of the lance. The LVDTs produce signals which correspond to the position of the lance, and these signals are monitored by a computer 51.

Operation and use of the system, and therein the method of the invention, can now be described. The tracer gas is mixed with water and supplied to the lance to produce a high velocity jet 52 which is directed toward the inlet ends of the condenser tubes 16. The lance can be swivelled to direct the jet toward any desired section of the tubesheet, and it can be advanced and retracted axially to control the size of the spray pattern impinging upon the tubesheet and, hence, the number of tubes into which the tracer gas is introduced. The tracer gas remains in solution in the cooling water side of the condenser. When it passes through a leak and enters the steam side of the condenser, it comes out of solution and passes into the exhaust system where it is sensed to detect the occurrence of a leak. The location of the leak is determined from the position of the lance, and the leaking tube can be identified more closely by moving the lance closer to the tubesheet to reduce the number of tubes into which the tracer gas is injected.

The invention has a number of important features and advantages. The condenser is monitored continuously during normal operation for the occurrence of leaks, which means that leaks can be detected almost immediately upon occurrence and avoids the need for costly shutdowns to locate leaks. The system is extremely sensitive, and leaks of very small size can be detected. The invention is not dependent on the type of fuel used to generate the steam, and it can be utilized in fossil fuel powered plants and in nuclear powered plants.

It is apparent from the foregoing that a new and improved system and method have been provided for detecting and locating leaks in a steam condenser. While only certain presently preferred embodiments have been described in detail, as will be apparent to those familiar with the art, certain changes and modifications can be made without departing from the scope of the invention as defined by the following claims.

What is claimed:

1. In an on-line system for detecting and locating leaks in a condenser having a plurality of tubes extending through a chamber while the condenser is connected to other equipment and operating in a normal manner: an injector which can be positioned toward different ones of the tubes for introducing a tracer gas into the same without interrupting the normal operation of the condenser, means for detecting presence of the tracer gas in the chamber, and means for monitoring the position of the injector to determine the location of a tube through which the tracer gas is leaking into the chamber.

2. The system of claim 1 wherein the injector comprises a lance having an axially extending passageway through which the tracer gas is discharged, and means mounting the lance for swiveling movement whereby the lance can be positioned to direct the tracer gas toward different ones of the tubes.

3. The system of claim 2 wherein the lance can be advanced and retracted axially.

4. In an on-line system for detecting and locating leaks in a condenser having a plurality of tubes extending through a chamber while the condenser is connected to other equipment and operating in a normal manner: means for mixing a tracer gas with water, an injector which can be positioned toward different ones of the tubes for directing a jet of water containing the tracer gas toward individual ones of the tubes without interrupting the normal operation of the condenser, means for detecting presence of the tracer gas in the chamber, and means for monitoring the position of the injector to determine the location of a tube through which the tracer gas is leaking into the chamber.

5. The system of claim 4 wherein the injector comprises a lance having an axially extending passageway through which the tracer gas is discharged, and means mounting the lance for swivelling movement whereby the lance can be positioned to direct the jet of water containing the tracer gas toward different ones of the tubes.

6. The system of claim 5 wherein the lance can be advanced and retracted axially.

7. In an on-line system for detecting and locating leaks in a condenser having a condensation chamber, inlet and outlet water boxes on opposite sides of the chamber, and a plurality of tubes extending between the water boxes and through the chamber: a lance extending through a wall of the inlet water box and having a distal end portion within the box, means mounting the lance on the wall for swivelling movement so that the distal end portion can be pointed toward different ones of the tubes, means for passing a tracer gas through the lance to a tube toward which the distal end portion is pointed while the condenser is operating in a normal manner, means for detecting presence of the tracer gas in the chamber, and means for monitoring the position of the lance to determine the location of a tube through which the tracer gas is leaking into the chamber.

8. The system of claim 7 wherein the means for passing the tracer gas through the lance includes means for mixing the tracer gas with water and means for discharging the water with the tracer gas through the lance.

9. In a system for detecting and locating leaks in a condenser having a condensation chamber, inlet and outlet water boxes on opposite sides of the chamber, and a plurality of tubes extending between the water boxes and through the chamber: a lance extending through a wall of the inlet water box and having a distal end portion within the box, means mounting the lance on the wall for swivelling movement so that the distal end portion can be pointed toward different ones of the tubes, means for passing a tracer gas through the lance to a tube toward which the distal end portion is pointed, means for detecting presence of the tracer gas in the chamber, and means including a plurality of linearly variable differential transformers operatively connected to the lance for providing output signals corresponding to the position of the lance to determine the location of a tube through which the tracer gas is leaking into the chamber.

10. The system of claim 7 wherein the lance can be advanced and retracted axially to position the distal end portion closer to or farther from the tubes.

11. In a method of detecting and locating leaks in a condenser having a plurality of tubes extending through a chamber: discharging a tracer gas in a predetermined direction toward the tubes, changing the direction in which the gas is discharged to introduce the gas into different ones of the tubes, detecting presence of the tracer gas in the chamber, and monitoring the direction in which the gas is discharged to determine the location of a tube through which the tracer gas is leaking into the chamber.

12. The method of claim 11 wherein the tracer gas is discharged through an elongated lance, and the orientation of the lance is changed to change the direction in which the gas is discharged.

13. The method of claim 12 including the steps of advancing and retracting the lance in an axial direction to vary the number of the tubes into which the tracer gas is introduced.

14. In a method of detecting and locating leaks in a condenser having a plurality of tubes extending through a chamber: mixing a tracer gas with water, directing a jet of the water containing the tracer gas toward different ones of the tubes to selectively introduce the tracer gas into the tubes, detecting presence of the tracer gas in the chamber, and monitoring the direction in which the jet is directed to determine the location of a tube through which the tracer gas is leaking into the chamber.

15. The method of claim 14 wherein the jet is discharged through an elongated lance, and the orientation of the lance is changed to change the direction in which the jet is discharged.

16. The method of claim 15 including the steps of advancing and retracting the lance in an axial direction to vary the number of the tubes into which the tracer gas is introduced.

* * * * *